United States Patent
Tsukigase et al.

(10) Patent No.: US 10,533,103 B2
(45) Date of Patent: Jan. 14, 2020

(54) LUSTROUS COATING MATERIAL COMPOSITION, LUSTROUS RESIN FILM, AND MULTILAYER COATING FILM

(71) Applicant: TOYOTA JIDOSHA KABUSHIKI KAISHA, Toyota-shi, Aichi (JP)

(72) Inventors: Azusa Tsukigase, Nagakute (JP); Makoto Kato, Nagakute (JP); Hidetaka Asano, Nisshin (JP); Masahiko Ishii, Okazaki (JP); Yu Takada, Toyota (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 435 days.

(21) Appl. No.: 15/075,276

(22) Filed: Mar. 21, 2016

(65) Prior Publication Data

US 2016/0312048 A1    Oct. 27, 2016

(30) Foreign Application Priority Data

Apr. 27, 2015 (JP) ................. 2015-090643

(51) Int. Cl.
| | | |
|---|---|---|
| C09D 7/40 | (2018.01) | |
| C09D 133/00 | (2006.01) | |
| C09D 5/36 | (2006.01) | |
| C09D 133/06 | (2006.01) | |
| C09D 133/14 | (2006.01) | |
| C08K 3/22 | (2006.01) | |

(52) U.S. Cl.
CPC ............ *C09D 7/70* (2018.01); *C09D 5/36* (2013.01); *C09D 133/00* (2013.01); *C09D 133/06* (2013.01); *C09D 133/14* (2013.01); *C08K 2003/2237* (2013.01); *Y10T 428/25* (2015.01)

(58) Field of Classification Search
CPC ................. C09D 295/03; C09D 7/70
See application file for complete search history.

(56) References Cited

U.S. PATENT DOCUMENTS

| | | | |
|---|---|---|---|
| 6,417,277 B1 | 7/2002 | Tomizaki et al. | |
| 2008/0210906 A1 | 9/2008 | Kawazu et al. | |
| 2009/0061257 A1* | 3/2009 | Yamamoto .......... | C01G 23/003 428/702 |

FOREIGN PATENT DOCUMENTS

| | | |
|---|---|---|
| CN | 102206462 A | 10/2011 |
| JP | 04-025578 A | 1/1992 |
| JP | 2000-344520 A | 12/2000 |
| JP | 2001-89696 A | 4/2001 |
| JP | 2006-257179 A | 9/2006 |
| JP | 2006-305515 A | 11/2006 |
| JP | 2009-221354 A | 10/2009 |
| JP | 2012-241072 A | 12/2012 |
| JP | 2013184883 A | 9/2013 |
| JP | 2015-7173 A | 1/2015 |

OTHER PUBLICATIONS

Nunes et al., Thermochemical data on the intercalation of aromatic amines into crystalline α-titanium hydrogenphosphate, Thermochimica Acta 435 (2005) 118-123 (Year: 2005).*

* cited by examiner

*Primary Examiner* — Elizabeth A Robinson
(74) *Attorney, Agent, or Firm* — Sughrue Mion, PLLC

(57) ABSTRACT

Provided is a lustrous coating material composition comprising a flaky titanic acid, a phosphoric acid group-containing resin, and an acrylic resin and being capable of forming a lustrous resin film which has a good silky texture with a high luster and which is sufficiently excellent in not only initial adhesion but also water-resistant adhesion with the occurrence of peeling being sufficiently suppressed.

3 Claims, No Drawings

LUSTROUS COATING MATERIAL COMPOSITION, LUSTROUS RESIN FILM, AND MULTILAYER COATING FILM

BACKGROUND OF THE INVENTION

Field of the Invention

The present invention relates to a lustrous coating material composition, and also to a lustrous resin film and a multilayer coating film obtained by using the lustrous coating material composition.

Related Background Art

Conventionally, effect pigments in which a titanium oxide layer is provided on a surface of a flaky material such as natural mica, synthetic mica, or flaky alumina have been used in many fields. These effect pigments have strong luster and a grainy texture (glittering luster), and are used as pigments for providing a pearl-like luster. To obtain an effect pigment which has a grainy texture-free silk-like luster, so called a silky texture, and which can provide a high quality design in contrast to the above-described effect pigments, the improvement of a flaky titanic acid (titania nanosheets) and/or a resin used has been attempted.

As an effect pigment capable of providing such a silky texture, Japanese Unexamined Patent Application Publication No. 2006-257179 (Patent Document 1) discloses an aqueous effect pigment dispersion containing a flaky titanic acid (titania nanosheets) in which interlayer swelling or delamination is caused by treating a layered titanic acid compound with an acid and then with an organic basic compound. In addition, Japanese Unexamined Patent Application Publication No. 2000-344520 (Patent Document 2) describes a flaky titanic acid useful as an additive for a coating material or the like and a method for producing the flaky titanic acid. Further, Japanese Unexamined Patent Application Publication No. 2006-305515 (Patent Document 3) discloses a multilayer coating film having a base layer containing a flaky titanic acid (flaky titanic acid pigment) and being excellent in anti-chipping property. Conventional resin films containing the flaky titanic acids as described in Patent Documents 1 to 3 have a good silky texture with a high luster, but do not necessarily have sufficient adhesion.

Meanwhile, such an effect pigment containing a flaky titanic acid has a problem in that when a coating film, especially, a multilayer coating film, is formed for a vehicle exterior by using the effect pigment, the coating film tends to easily undergo local peeling. Because of the high hydrophilicity, the flaky titanic acid interacts weakly with resins, which are generally hydrophobic. For this reason, the adhesion of the flaky titanic acid to a resin is weak, and adhesion sufficient for a coating film cannot be obtained. Actually, it has been known that the delamination occurs at titania interlayers where no resin layers are present.

As coating material compositions capable of improving the adhesion, Japanese Unexamined Patent Application Publication No. 2012-241072 (Patent Document 4) discloses a lustrous coating material composition containing a flaky titanic acid and an amino group-containing acrylic resin having an amine value of 0.05 to 0.3 mmol/g-solid, and Japanese Unexamined Patent Application Publication No. 2015-7173 (Patent Document 5) discloses a lustrous coating material composition containing an acrylic resin and a flaky titanic acid to which a urethane resin is bound.

However, recently, such a lustrous coating material composition has been required to have increasingly higher levels of properties, and there has been a demand for a lustrous coating material composition capable of forming a lustrous resin film which has a good silky texture with a high luster and which has not only an initial adhesion but also a better water-resistant adhesion with the occurrence of peeling being sufficiently suppressed.

SUMMARY OF THE INVENTION

Problems to be Solved by the Invention

The present invention has been made in view of the problems of the above-described technologies, and an object of the present invention is to provide a lustrous coat ing material composition capable of forming a lustrous resin film which has a good silky texture with a high luster and which is sufficiently excellent in not only initial adhesion but also water-resistant adhesion with the occurrence of peeling being sufficiently suppressed, and to provide a lustrous resin film and a multilayer coating film which are obtained by using the lustrous coating material composition and which have a good silky texture and has an excellent initial adhesion and an excellent water-resistant adhesion.

Means for Solving the Problems

The present inventors have conducted intensive study to achieve the above-described object, and consequently found that the use of a coating material composition comprising a flaky titanic acid, a phosphoric acid group-containing resin, and an acrylic resin makes it possible to provide a lustrous coating material composition capable of forming a lustrous resin film which has a good silky texture with a high luster and which is sufficiently excellent in not only initial adhesion but also water-resistant adhesion with the occurrence of peeling being sufficiently suppressed and a lustrous resin film and a multilayer coating film which are obtained by using the lustrous coating material composition and which have a good silky texture and has an excellent initial adhesion and an excellent water-resistant adhesion. This finding has led to the completion of the present invention.

A lustrous coating material composition of the present invention comprises: a flaky titanic acid; a phosphoric acid group-containing resin; and an acrylic resin.

In the lustrous coating material composition of the present invention, the flaky titanic acid is preferably treated with at least one organic base selected from the group consisting of alkyl amine compounds having 2 to 3 carbon atoms, alkanolamines and heterocyclic amines, and is more preferably treated with a hydrophobic heterocyclic amine.

In addition, in the lustrous coating material composition of the present invention, an amount of the phosphoric acid group-containing resin blended is preferably 1 to 30% by mass based on a total resin solid content of the lustrous coating material composition.

A lustrous resin film of the present invention comprises: an acrylic resin; a flaky titanic acid dispersed in the acrylic resin; and a phosphoric acid group-containing resin dispersed in the acrylic resin.

In the lustrous resin film of the present invention, the flaky titanic acid is preferably treated with at least one organic base selected from the group consisting of alkyl amine compounds having 2 to 3 carbon atoms, alkanolamines and heterocyclic amines, and is more preferably treated with a hydrophobic heterocyclic amine.

In addition, in the lustrous resin film of the present invention, an amount of the phosphoric acid group-containing resin blended is preferably 1 to 30% by mass based on a total resin solid content of the lustrous resin film.

A multilayer coating film of the present invention comprises at least: a base layer and a clear layer stacked on a coated article, wherein the above-described lustrous resin film of the present invention is provided between the base layer and the clear layer.

Note that although it is not exactly clear why the present invention achieves the above-described object, the present inventors speculate as follows. Specifically, first, the lustrous coating material composition of the present invention comprises the flaky titanic acid and the phosphoric acid group-containing resin. Hence, the surface of the flaky titanic acid is protected with the phosphoric acid group-containing resin because of the adsorption effect of acidic hydroxyl groups bound to phosphorus atoms. As a result, the compatibility between the flaky titanic acid and the acrylic resin (hydrophilic base resin) is improved, and the flaky titanic acid strongly interacts with the acrylic resin. Presumably because of this, a firm coating film can be formed which is sufficiently excellent in not only initial adhesion but also water resistance (water-resistant adhesion).

In addition, in the lustrous coating material composition of the present invention, the surface of the flaky titanic acid is protected with the phosphoric acid group-containing resin by utilizing the adsorption effect of the acidic hydroxyl groups bound to phosphorus atoms. Presumably for this reason, the reaction with water is inhibited even when the lustrous coating material composition comes into contact with water, so that the water resistance (water-resistant adhesion) is improved.

Moreover, in the present invention, the flaky titanic acid used as an effect pigment has a higher refractive index than the acrylic resin and the phosphoric acid group-containing resin which are used together. Accordingly, the obtained lustrous resin film contains components having different refractive indices. Presumably for this reason, the obtained lustrous resin film has a silk-like, deep, soft, and denseness luster, which is so called a good silky texture.

As described above, the present inventors speculates that the above-described effect makes it possible to provide a lustrous coating material composition capable of forming a lustrous resin film which has a good silky texture with a high luster and which is sufficiently excellent in not only initial adhesion but also water-resistant adhesion with the occurrence of peeling being sufficiently suppressed, and moreover makes it possible to provide a lustrous resin film and a multilayer coating film which are obtained by using the lustrous coating material composition and which have a good silky texture and has an excellent initial adhesion and an excellent water-resistant adhesion.

Effects of the Invention

According to the present invention, it is possible to provide a lustrous coating material composition capable of forming a lustrous resin film which has a good silky texture with a high luster and which is sufficiently excellent in not only initial adhesion but also water-resistant adhesion with the occurrence of peeling being sufficiently suppressed, and a lustrous resin film and a multilayer coating film which are obtained by using the lustrous coating material composition and which have a good silky texture and has an excellent initial adhesion and an excellent water-resistant adhesion.

DETAILED DESCRIPTION OF THE PREFERRED EMBODIMENTS

Hereinafter, the present invention will be described in detail based on preferred embodiments thereof.

[Lustrous Coating Material Composition]

First, a lustrous coating material composition of the present invention is described. The lustrous coating material composition of the present invention comprises: a flaky titanic acid; a phosphoric acid group-containing resin; and an acrylic resin.

(Flaky Titanic Acid)

The lustrous coating material composition of the present invention has to comprise a flaky (lamellar) titanic acid. The flaky titanic acid used in the present invention is not particularly limited, as long as the flaky titanic acid is a flaky titanium oxide. Specifically, so-called titania nanosheets are preferably used. The flaky titanic acid has an average thickness of preferably 0.5 to 300 nm, and more preferably 0.5 to 100 nm. In general, it tends to be difficult to produce a flaky titanic acid having an average thickness less than the lower limit. Meanwhile, when a flaky titanic acid having an average thickness exceeding the upper limit is used, the grainy texture tends to become noticeable, and the silky texture tends to be impaired.

In addition, the flaky titanic acid used in the present invention has an average longer diameter of preferably 5 to 50 μm and more preferably 15 to 50 μm. If the average longer diameter is less than the lower limit, it tends to be difficult to obtain a sufficient silky texture. Meanwhile, it tends to be difficult to produce a flaky titanic acid having an average longer diameter exceeding the upper limit, in general. Note that, the average longer diameter herein means an average particle diameter in a direction of a plane perpendicular to a thickness direction of the flaky titanic acid. In addition, the average longer diameter and the above-described average thickness can be determined by observation with a scanning electron microscope (SEM) or the like.

Moreover, an average aspect ratio (a ratio of the average longer diameter to the average thickness) of the flaky titanic acid used in the present invention is preferably 1000 to 10000. If the average aspect ratio is lower than the lower limit, it tends to be difficult to obtain a sufficient silky texture. Meanwhile, if the average aspect ratio exceeds the upper limit, it tends to be difficult to uniformly disperse the flaky titanic acid in a resin film.

The flaky titanic acid used in the present invention is obtained by a conventionally known method, for example, a method described in any of Patent Documents 1 to 3 mentioned above. The flaky titanic acid (for example, titania nanosheets) used in the present invention can be obtained preferably by performing an organic base treatment on a layered titanic acid for delamination to single-layer sheets (conversion to nanosheets) as described below.

The layered titanic acid used here is not particularly limited. Specifically, the layered titanic acid can be obtained preferably by performing an acid treatment on a layered titanate.

Examples of the layered titanate used here include lepidocrocite-type layered titanates (for example, $Cs_xTi_{2-x/4}O_4$ (provided that $0 \leq x \leq 1$), $A_xTi_{2-x/3}Li_{x/3}O_4$ (provided that $A=K$, Rb, or Cs; $0.5 \leq x \leq 1$), and the like) and the like. Specific examples of the lepidocrocite-type layered titanates include $K_{0.8}Ti_{1.73}Li_{0.27}O_4$, $Rb_{0.75}Ti_{1.75}Li_{0.25}O_4$, $Cs_{0.7}Ti_{1.77}Li_{0.23}O_4$, $Cs_{0.7}Ti_{1.825}O_4$ and the like.

The lepidocrocite-type layered titanate can be prepared by mixing, for example, $K_2CO_3$, $Rb_2CO_3$, or $Cs_2CO_3$, anatase-type $TiO_2$, and, if necessary, other metal carbonates such as $Li_2CO_3$ at a predetermined mole ratio and calcining this mixture in air at a high temperature of 600 to 1200° C. generally for 6 to 24 hours.

In addition, to increase the aspect ratio of the obtained flaky titanic acid, it is effective to employ a method for preparing the layered titanate in which a large-sized layered titanate is prepared by using a molten salt such as KCl and this large-sized layered titanate is sequentially subjected to an acid treatment and a base treatment described later.

The thus prepared lepidocrocite-type layered titanate has a crystal structure in which host layers and metal ion layers are alternately stacked on each other. Here, each of the host layers is formed in such a manner that octahedra each formed of six oxygen atoms coordinated to a titanium atom are linked to each other in a two-dimensional direction, while sharing edges. In each of the host layers, some of the titanium sites are vacant, and hence the host layer as a whole is negatively charged. The negative charges are compensated by the metal ion layers, so that the lepidocrocite-type layered titanate as a whole is kept electrically neutral.

First, the layered titanate is mixed with an acid, followed by stirring. Since the metal ion layers show a high ion-exchanging capacity, a high proportion of, or preferably all of the metal ions other than Ti ions are exchanged with hydrogen ions by this acid treatment, while the layered structure is being retained. As a result, a hydrogen-type layered titanic acid (for example, $H_xTi_{2-x/4}O_4 \cdot nH_2O$ (provided that $0.5 \leq x \leq 1$) or $H_{x+x/3}Ti_{2-x/3}O_4 \cdot nH_2O$ (provided that $0.5 \leq x \leq 1$)) is formed. After that, the obtained hydrogen-type layered titanic acid is washed. To exchange a higher proportion of the metal ions other than Ti ions with hydrogen ions, it is preferable to repeat the acid treatment and the washing treatment multiple times.

In the acid treatment on the layered titanate, an acid treatment time is preferably about 1 to 5 days. If the acid treatment time is shorter than the above-described lower limit or longer than the above-described upper limit, it tends to be difficult to conduct the delamination of the layered titanic acid to single-layer sheets by an organic base treatment described later. Examples of the acid used in the acid treatment include strong acids such as hydrochloric acid, nitric acid, and sulfuric acid. A concentration of the acid is preferably 0.1 to 10 N. In addition, it is preferable to mix 1 to 50 g of the layered titanate per liter of the acid having the above-described concentration. A temperature of the acid treatment is preferably 0 to 50° C. By setting these conditions within the above-describe ranges, a higher proportion of the metal ions tend to be exchanged with hydrogen ions in the above-described acid treatment time.

Next, the layered titanic acid is mixed with an organic base, followed by stirring. The layered titanic acid is a solid acid. When mixed with an organic base, the layered titanic acid incorporates the organic base between layers as a guest. If the layered titanic acid is vigorously stirred here, the layered titanic acid is delaminated to single-layer sheets (converted to nanosheets), so that a dispersion containing the single-layered flaky titanic acid (for example, titania nanosheets) can be obtained.

In the organic base treatment, a time of the organic base treatment is preferably about 1 to 5 days. If the time of the organic base treatment is shorter than the above-described lower limit, it tends to be difficult to delaminate the layered titanic acid to the single-layer sheets. Meanwhile, if the time of the organic base treatment is longer than the above-described upper limit, the aspect ratio tends to decrease, because the flaky titanic acid is fractured.

In addition, the organic base is not particularly limited, as long as the organic base is an organic basic substance. Specific examples thereof include primary to tertiary alkyl amine compounds having 2 to 3 carbon atoms such as ethylamine and propylamine; alkanolamines such as diethylethanolamine and dimethylethanolamine (DMEA); heterocyclic amines such as morpholines and piperidines; and the like. It is preferable to use a hydrophobic organic base other than quaternary ammonium hydroxides. The interlayer water in the flaky titanic acid tends to decrease by the organic base treatment of the layered titanic acid using a hydrophobic organic base as described above. The use of the lustrous coating material composition containing the flaky titanic acid treated with the organic base makes it possible to obtain a lustrous resin film and a multilayer coating film which have improved adhesion. Note that, from the viewpoint of further improving the water resistance (water-resistant adhesion), the organic base is more preferably at least one organic base selected from the group consisting of alkyl amine compounds having 2 to 3 carbon atoms, alkanolamines, and heterocyclic amines, and the flaky titanic acid is preferably treated with at least one organic base selected from the group consisting of alkyl amine compounds having 2 to 3 carbon atoms, alkanolamines, and heterocyclic amines. Of these organic bases, heterocyclic amines such as morpholines are further preferable, and methylmorpholine is particularly preferable. Presumably, the organic base used to prepare the flaky titanic acid stays in the coating film, and is hydrated upon contact with water, so that the water-resistant adhesion tends to decrease. In this respect, the use of a preferred organic base such as methylmorpholine having hydrophobicity tends to further inhibit water from entering the coating film upon contact with water and hence further improve the water resistance (water-resistant adhesion).

The organic base is generally used after being dissolved in a solvent such as water. A concentration of the organic base in this solution is preferably 0.1 to 3 mol/L. In addition, the layered titanic acid and the organic base are mixed at a mole ratio (layered titanic acid/organic base) of preferably 1/5 to 2/1, and particularly preferably approximately 2/1. A temperature of the organic base treatment is preferably 0 to 50° C. By setting these conditions within the above-described ranges, it tends to be possible to convert the layered titanic acid to the nanosheets to a higher degree in the above-described organic base treatment time.

(Phosphoric Acid Group-Containing Resin)

The lustrous coating material composition of the present invention has to comprise a phosphoric acid group-containing resin.

An amount of the phosphoric acid group-containing resin blended in the lustrous coating material composition of the present invention is preferably 1 to 30% by mass based on a total resin solid content of the lustrous coating material composition. If the blended amount of the phosphoric acid group-containing resin based on the total resin solid content of the lustrous coating material composition is less than the above-described lower limit or exceeds the above-described upper limit, the water resistance tends to decrease. The amount of the phosphoric acid group-containing resin blended is more preferably 3 to 15% by mass based on the total resin solid content of the lustrous coating material composition, from the viewpoint of the water resistance of a coating film.

In addition, the phosphoric acid group-containing resin used in the present invention is not particularly limited, and specific examples thereof include phosphoric acid group-containing copolymers and the like. Of these phosphoric acid group-containing resins, the phosphoric acid group-containing resin is more preferably a copolymer of a phosphoric acid group-containing acrylic monomer and an acrylate ester, particularly from the viewpoint of obtaining a coating film having better coating film performances such as adhesion and water-resistant adhesion. Examples of the phosphoric acid group-containing acrylic monomer include acid phosphoxy polyoxyethylene glycol monomethacrylate, acid phosphoxy polyoxypropylene glycol monomethacrylate, methacryloyl oxyethyl acid phosphate monoethanolamine half salt, and the like. In addition, as the phosphoric acid group-containing resins, commercially available ones can be used, such as acid phosphoxy polyoxyethylene glycol monomethacrylate (manufactured by Unichemical Co., Ltd., under the trade name of Phosmer (registered trademark) PE), acid phosphoxy polyoxypropylene glycol monomethacrylate (manufactured by Unichemical Co., Ltd., under the trade name of Phosmer (registered trademark) PP), and methacroyl oxyethyl acid phosphate monoethanolamine half salt (manufactured by Unichemical Co., Ltd., under the trade name of Phosmer (registered trademark) MH).

Such a phosphoric acid group-containing resin also acts as an additive that inhibits the reaction of the flaky titanic acid with water. The use of a lustrous coating material composition obtained by using the phosphoric acid group-containing resin as a resin in which the flaky titanic acid prepared by the organic base treatment is dispersed makes it possible to form coating films (a lustrous resin film and a multilayer coating film) excellent in coating film performances such as adhesion and water resistance (water-resistant adhesion).

(Acrylic Resin)

The lustrous coating material composition of the present invention has to comprise an acrylic resin. The acrylic resin used in the present invention is not particularly limited, and specific examples thereof include copolymers of acrylic monomers with other ethylenic unsaturated monomers. Examples of the acrylic monomers usable for the copolymers include acrylate esters and methacrylate esters including: esters of acrylic acid or methacrylic acid such as methyl, ethyl, propyl, n-butyl, i-butyl, t-butyl, 2-ethylhexyl, lauryl, phenyl, benzyl, 2-hydroxyethyl, 2-hydroxypropyl, and 4-hydroxybutyl acrylates or methacrylates; ring-opened adducts of 2-hydroxyethyl acrylate or methacrylate to caprolactone; glycidyl acrylate; glycidyl methacrylate; acrylamide; methacrylamide; N-methylolacrylamide; (meth)acrylate esters of polyols; and the like. Examples of the other ethylenic unsaturated monomers copolymerizable with these acrylic monomers include acrylonitrile, styrene, styrene derivatives, and acrylic monomers such as acrylic acid, methyl acrylate, ethyl acrylate, propyl acrylate, hydroxyethyl acrylate, methacrylic acid, methyl methacrylate, ethyl methacrylate, propyl methacrylate, and hydroxyethyl methacrylate.

(Lustrous Coating Material Composition)

The lustrous coating material composition of the present invention comprises: the flaky titanic acid; the phosphoric acid group-containing resin; and the acrylic resin. The lustrous coating material composition of the present invention preferably further comprises a solvent capable of dissolving the acrylic resin. The solvent is not particularly limited, and examples thereof include water and various organic solvents which are the same as those used for the preparation of the above-described alkyl resin. One of these solvents may be used alone, or two or more thereof may be used as a mixture. A concentration (solid content concentration) of the acrylic resin in the lustrous coating material composition of the present invention is not particularly limited, and is preferably 3 to 20% by mass, and more preferably 5 to 15% by mass, in general.

An amount of the flaky titanic acid blended in the lustrous coating material composition of the present invention is preferably 10 part by mass or more, and more preferably 10 to 30 parts by mass, relative to 100 parts by mass of the solid content of the acrylic resin. If the amount of the flaky titanic acid blended is less than the lower limit, it tends to be difficult to obtain a sufficiently silky texture. Meanwhile, if the amount of the flaky titanic acid blended exceeds the upper limit, the adhesion tends to decrease.

The lustrous coating material composition of the present invention can be obtained by mixing the flaky titanic acid, the phosphoric acid group-containing resin, and the acrylic resin together. The order of mixing of the flaky titanic acid, the phosphoric acid group-containing resin, and the acrylic resin is not particularly limited. For example, any method can be employed such as a method in which the lustrous coating material composition is prepared by simultaneously mixing the flaky titanic acid, the phosphoric acid group-containing resin, and the acrylic resin together, or a method in which a dispersion is prepared in advance by mixing the flaky titanic acid with the phosphoric acid group-containing resin, and then the lustrous coating material composition is prepared by mixing this flaky titanic acid dispersion with the acrylic resin. Specifically, in the case of the simultaneous mixing, the lustrous coating material composition can be obtained preferably by dispersing the flaky titanic acid and the phosphoric acid group-containing resin in a solution of the acrylic resin. A dispersing method is not particularly limited, and examples thereof include methods using a homogenizer, a ball mill, a dispersion mill, a triple-roll mill, or the like.

Note that the method for preparing the lustrous coating material composition of the present invention is more preferably a method in which the flaky titanic acid dispersion is prepared in advance by mixing the flaky titanic acid with the phosphoric acid group-containing resin, and this flaky titanic acid dispersion is mixed with the acrylic resin, and further, if necessary, additives such as a curing agent in an aqueous medium and dispersed therein. Specifically, for example, a method is preferable in which the flaky titanic acid and a solution of the phosphoric acid group-containing resin with the solid content adjusted to about 30 to 70% by mass are uniformly mixed with each other at the above-described blending ratio, so that the phosphoric acid group-containing resin is adsorbed onto the surface of the flaky titanic acid; and subsequently, after neutralization with a base and dispersing, these are mixed with the acrylic resin, an optionally added curing agent, and the like in an aqueous medium such as water, and dispersed therein.

Examples of the base include amines such as ammonia, dimethylamine, triethylamine, and ethanolamine. One of these bases can be used alone, or two or more thereof can be used in combination.

In addition, in the preferred method for preparing the lustrous coating material composition of the present invention, it is preferable to neutralize the mixture of the phosphoric acid group-containing resin and the flaky titanic acid by using a base. In such a case, the pH is preferably adjusted to 8.3 to 8.8. If the value of the pH adjusted with a base is either lower than the above-described lower limit or higher than the above-described upper limit, gel formation or aggregation tends to occur.

In the method for producing the lustrous coating material composition of the present invention, it is preferable to neutralize the phosphoric acid group-containing resin with a base prior to the blending of the phosphoric acid group-containing resin. Examples of the base include the above-described bases.

In addition, the lustrous coating material composition of the present invention can comprise, as appropriate, other additives which can be used without impairing any effect of the present invention. Examples of the other additives include additives generally used for coating materials such as thickers, ultraviolet absorbers, antioxidants, leveling agents, surface-conditioning agents, anti-sagging agents, anti-foaming agents, and activators. A total amount of the other additives blended is generally 5% by mass or less, and preferably 1% by mass or less relative to the lustrous coating material composition. Meanwhile, the total amount of the other additives blended is generally 10% by mass or less and preferably 3% by mass or less relative to the coating film.

[Lustrous Resin Film]

Next, a lustrous resin film of the present invention is described. The lustrous resin film of the present invention comprises: the acrylic resin; and the flaky titanic acid dispersed in the acrylic resin; and the phosphoric acid group-containing resin dispersed in the acrylic resin. The lustrous resin film of the present invention can be formed by applying the above-described lustrous coating material composition of the present invention onto, for example, a substrate, and then drying (preheating) and baking (bake-hardening) the coating film. A film thickness (film thickness after the baking) of the lustrous resin film is not particularly limited, and is preferably 1 to 100 μm and more preferably 5 to 40 μm. If the film thickness is less than the above-described lower limit, the amount of the flaky titanic acid is so small that it tends to be difficult to obtain the silky texture. Meanwhile, if the film thickness exceeds the above-described upper limit, defects such as bubble defects tend to be formed in the coating film, so that the appearance tends to be deteriorated.

A method for the application of the lustrous coating material composition is not particularly limited, and various conventionally known application methods can be employed. Application methods in which a shearing force acts such as spray coating or doctor blade coating are preferable. Such a method makes it possible to more surely disperse the flaky titanic acid in a manner oriented in parallel to a film surface, so that a lustrous resin film having a design with a more silky texture tends to be obtained.

In the lustrous resin film of the present invention, the flaky titanic acid is preferably treated with at least one organic base selected from the group consisting of alkyl amine compounds having 2 to 3 carbon atoms, alkanolamines, and heterocyclic amines, from the viewpoint of further improving the water resistance (water-resistant adhesion).

In addition, an amount of the phosphoric acid group-containing resin blended in the lustrous resin film of the present invention is preferably 1 to 30% by mass based on the total resin solid content of the lustrous resin film. If the blended amount of the phosphoric acid group-containing resin based on the total resin solid content of the lustrous resin film is less than the above-described lower limit or more than the above-described upper limit, the water resistance tends to decrease. The amount of the phosphoric acid group-containing resin blended is more preferably 3 to 15% by mass based on the total resin solid content of the lustrous resin film, from the viewpoint of the water resistance of the coating film.

An amount of the flaky titanic acid blended in the lustrous resin film of the present invention is preferably 10 part by mass or more, and more preferably 10 to 30 parts by mass, relative to 100 parts by mass of the solid content of the acrylic resin. If the amount of the flaky titanic acid blended is less than the lower limit, it tends to be difficult to obtain a sufficient silky texture. Meanwhile, if the amount of the flaky titanic acid blended exceeds the upper limit, the adhesion tends to decrease.

[Multilayer Coating Film]

Next, a multilayer coating film of the present invention is described. The multilayer coating film of the present invention comprises at least: a base layer and a clear layer stacked on a coated article; wherein the lustrous resin film of the present invention is provided between the base layer and the clear layer. When the multilayer coating film of the present invention is formed as a vehicle exterior, it is preferable that at least an electrodeposition layer, an intermediate coat layer, and a base layer be stacked on a coated article such as a steel plate, that the lustrous resin film of the present invention be stacked thereon, and further that at least a clear layer be stacked thereon.

The electrodeposition layer (electrodeposition coating film) is not particularly limited, and can be obtained by, for example, coating a surface of a coated article such as a steel plate by using a cationic electrodeposition coating material as an under coating material. Here, as the cationic electrodeposition coating material, it is preferable to use an aqueous solution or an aqueous dispersion of a salt of a cationic polymer compound which is known per se and, if necessary, which is blended with a cross-linking agent, a pigment, or various other additives. Examples of the cationic polymer compounds include those obtained by introducing a cationic group such as an amino group to an acrylic or epoxy resin having a cross-linkable functional group. Such a cationic polymer compound can be made water-soluble or water-dispersible by neutralization with an organic acid or an inorganic acid. As a cross-linking agent for curing these polymer compounds, a blocked polyisocyanate compound, an alicyclic epoxy resin, or the like can be used. A film thickness (film thickness after baking) of the electrodeposition layer is not particularly limited, and is preferably about 10 to 40 μm, in general.

In addition, an intermediate coating material for forming the intermediate coat layer (intermediate coating film) is not particularly limited, and, for example, a thermosetting resin composition basically made of a base resin and a cross-linking agent is preferably used. Examples of the base resin include acrylic resins, polyester resins, alkyd resins, and the like each having two or more cross-linkable functional groups such as hydroxyl groups, epoxy groups, isocyanate groups, or carboxyl groups in a single molecule. In addition, examples of the cross-linking agent include amino resins such as melamine resin and urea resin, optionally blocked polyisocyanate compounds, carboxyl group-containing compounds, and the like. A film thickness (film thickness after baking) of the intermediate coat layer is not particularly limited, and is preferably about 10 to 30 μm, in general.

Moreover, a base coating material for forming the base layer (base coating film) is not particularly limited, and, for example, a known solvent-based colored base coating material or an water-based colored base coating material is preferably used. Examples of the water-based colored base coating material include those containing a pigment, a water-soluble or water-dispersible resin, water serving as the solvent, and, if necessary, a cross-linking agent. Examples of the water-soluble or water-dispersible resin include resins having a hydrophilic group such as carboxyl group and a cross-linkable functional group such as a hydroxyl group in a single molecule. Specific examples thereof include acrylic resins, polyester resins, polyurethane resins, and the like. Meanwhile, examples of the cross-linking agent include hydrophobic or hydrophilic alkyl ether melamine resins, blocked isocyanate compounds, and the like. Meanwhile, examples of the solvent-based colored base coating material include those containing a pigment, a resin as described above, and a solvent, and, if necessary, a cross-linking agent. A film thickness (film thickness after baking) of the base layer is not particularly limited, and is preferably about 5 to 20 μm, in general.

In addition, a clear coating material for forming the clear layer (clear coating film) is not particularly limited, and examples thereof include those containing a thermosetting resin capable of forming a transparent coating film, an organic solvent, and, if necessary, an ultraviolet absorber and the like. Examples of the thermosetting resin include those containing a resin such as an acrylic resin, a polyester resin, an alkyd resin, a fluororesin, a urethane resin, or a silicon-containing resin having a cross-linkable functional group such as a hydroxyl group, a carboxyl group, a silanol group, or an epoxy group and a cross-linking agent capable of reacting with any of these cross-linkable functional groups, such as a melamine resin, a urea resin, a (blocked) polyisocyanate compound, an epoxy resin compound or resin, a carboxyl group-containing compound or resin, an acid anhydride, or an alkoxysilane group-containing compound or resin. A film thickness (film thickness after baking) of the clear layer is not particularly limited, and is preferably about 20 to 50 μm, in general.

In the multilayer coating film of the present invention, the lustrous resin film of the present invention is provided between the base layer and the clear layer. A method for forming the lustrous resin film and the like are as described above. In addition, conditions of the treatments for drying (preheating) and baking (bake-hardening) the coating film are not particularly limited in the present invention, and, for example, 60 to 90° C. and about 1 to 5 minutes are preferably employed as the conditions of the drying treatment, and 140 to 220° C. and about 10 to 40 minutes are preferably employed as the conditions of the baking treatment.

Each of the lustrous resin film and the multilayer coating film of the present invention obtained by using the lustrous coating material composition of the present invention described above has a so-called silky texture in which the flaky titanic acid dispersed in the film shines like silk. The silky texture can be evaluated based on the flip-flop property (FF property) described in Examples later. In addition, the lustrous resin film and the multilayer coating film of the present invention are excellent in adhesion (initial adhesion) with the occurrence of peeling and the like sufficiently suppressed. The adhesion can be evaluated by a cross-cut peeling test described in Examples later. Moreover, the lustrous resin film and the multilayer coating film of the present invention are excellent in water-resistant adhesion (water resistance) with the occurrence of peeling and the like sufficiently suppressed even in contact with water. The water-resistant adhesion can be evaluated by a cross-cut peeling test conducted after immersion in water as described in Examples later.

EXAMPLES

Hereinafter, the present invention is described more specifically on the basis of Examples and Comparative Examples; however, the present invention is not limited to Examples below.

Example 1

Production of Flaky Titanic Acid $K_2CO_3$ (6.138 g), $Li_2CO_3$ (1.094 g), anatase-type $TiO_2$ (15.374 g), and KCl (20.002 g) as a flux were sufficiently mixed by using a mortar for 10 minutes. This mixture was held in air at 820° C. for 1 hour to melt KCl, and then calcined at 1000° C. for 8 hours. After that, the reaction product was cooled slowly to obtain a layered titanate. X-ray diffraction measurement by using an X-ray diffractometer (RINT2100 manufactured by Rigaku Corporation) showed that the layered titanate was $K_{0.8}Ti_{1.73}Li_{0.27}O_4$. In addition, observation using a scanning electron microscope (S3600N manufactured by Hitachi High-Technologies Corporation) showed that the layered titanate was in the form of fine particles with an average particle diameter of 30 μm.

Next, 15 g of the layered titanate was mixed with 1 L of 0.5 N hydrochloric acid, and the mixture was stirred with a stirrer at room temperature for one day. By this acid treatment, $K^+$ and $Li^+$ in $K_{0.8}Ti_{1.73}Li_{0.27}O_4$ were substituted with $H_3O^+$, while the layered structure was retained. Thus, a layered titanic acid ($H_{0.7}Ti_{1.825}O_4 \cdot H_2O$) was obtained. After that, this layered titanic acid was washed with water and filtered.

Subsequently, the layered titanic acid and methylmorpholine at a concentration of 9.1 mol/L were mixed at a mole ratio ($H_{0.7}Ti_{1.825}O_4 \cdot H_2O$:methylmorpholine) of 5:4 (the concentration of titanic acid was 15%, by mass), and the mixture was stirred with a stirrer at room temperature for one day. Thus, an aqueous flaky titanic acid dispersion was obtained.

Observation using an atomic force microscope (D3100 and NanoScopeIIIa manufactured by VEECO, tapping mode, super sharp tip was used) showed that the flaky titanic acid in the obtained aqueous flaky titanic acid dispersion was in the form of titanic acid flakes (titania nanosheets) formed by delamination to single-layer sheets with an average thickness of 1 nm and an average longer diameter of 30 μm.

<Preparation of Lustrous Coating Material Composition>

The obtained aqueous flaky titanic acid dispersion (flaky titanic acid content: 0.75 g) was uniformly mixed with 1.24 g of a phosphoric acid group-containing resin (manufactured by DAP Co. Ltd., under the trade name of Polyphosmer MHB-10). Further, the pH was adjusted to 8.5 by adding 3 g (0.003 mol) of a 10% by mass aqueous dimethylethanolamine (DMEA) solution. Thus, a titania nanosheet dispersion paste was obtained.

Next, 9.24 g of the obtained titania nanosheet dispersion paste was added to a mixture of 16 g of an acrylic resin (manufactured by DIC Corporation under the trade name of BURNOCK (registered trademark) WE300) and 35 g of water. Further, 4 g of a water-dispersible polyisocyanate (manufactured by DIC Corporation under the trade name of BURNOCK (registered trademark) DNW-5000) was added at an NCO/OH ratio of 1.2, followed by mixing. Thus, a lustrous coating material composition was prepared. Note that the amount of the phosphoric acid group-containing resin blended was 5% by mass based on the total resin solid content of the lustrous coating material composition. In addition, the amount of the flaky titanic acid blended was 10 parts by mass relative to 100 parts by mass of the solid content of the acrylic resin in the lustrous coating material composition.

<Preparation of Multilayer Coating Films>

On a zinc-plated steel plate subjected to a zinc phosphate chemical conversion treatment, a cationic electrodeposition coating material (manufactured by Kansai Paint Co., Ltd. under the trade name of ELECRON GT-10) was electrodeposited to a thickness which resulted in 15 μm after curing, and was thermally cured at 170° C. for 20 minutes. On this film, an automotive intermediate coating material (manufactured by Kansai Paint Co., Ltd. under the trade name of AMILAC TP-65) was air-spray coated to a thickness which resulted in 35 μm after curing, and then thermally cured at 140° C. for 30 minutes. On this film, a colored base coating material (manufactured by Kansai Paint Co., Ltd., under the trade name of TP-58 (White)) was stacked to results in a cured film thickness of 30 μm. Thus, a white coated plate was prepared. On this white coated plate, the lustrous coating material composition was applied by a doctor blade method to a thickness which resulted in 15 μm after curing, and heated at 80° C. for 3 minutes and further at 140° C. for 30 minutes. After that, on the cured coating surface, an isocyanate curing type two-part clear coating material (manufactured by Nippon Bee Chemical under the trade name of R-298 Clear) was stacked by a doctor blade method to a thickness which resulted in 35 μm after curing, and baked at 140° C. for 30 minutes. In this manner, each multilayer coating film was prepared. Note that, in Example 1, six coating films were prepared as multilayer coating films for evaluation tests. Note that the amount of the phosphoric acid group-containing resin blended was 5% by mass based on the total resin solid content of the lustrous resin film. In addition, the amount of the flaky titanic acid blended was 10 parts by mass relative to 100 parts by mass of the solid content of the acrylic resin in the lustrous resin film.

Example 2

A lustrous coating material composition was prepared and further multilayer coating films were prepared in the same manner as in Example 1, except that the amount of the phosphoric acid group-containing resin blended was changed to 10% by mass based on the total resin solid content of the lustrous coating material composition. Note that the amount of the flaky titanic acid blended in the lustrous coating material composition was 10 parts by mass relative to 100 parts by mass of the solid content of the acrylic resin in the lustrous coating material composition. In Example 2, six coating films were prepared as multilayer coating films for evaluation tests.

Example 3

A lustrous coating material composition was prepared and further multilayer coating films were prepared in the same manner as in Example 1, except that the amount of the phosphoric acid group-containing resin blended was changed to 15% by mass based on the total resin solid content of the lustrous coating material composition. Note that the amount of the flaky titanic acid blended in the lustrous coating material composition was 10 parts by mass relative to 100 parts by mass of the solid content of the acrylic resin in the lustrous coating material composition. In Example 3, six coating films were prepared as multilayer coating films for evaluation tests.

Example 4

A lustrous coating material composition was prepared and further multilayer coating films were prepared in the same manner as in Example 1, except that the lustrous coating material composition was prepared as follows. Specifically, 1.24 g of the phosphoric acid group-containing resin and 35 g of water were added to 16 g of an acrylic resin (manufactured by DIC Corporation under the trade name of BURNOCK (registered trademark) WE300), and the materials were uniformly mixed. Then, the pH of this mixture was adjusted to 8.5 by adding 3 g (0.003 mol) of dimethylethanolamine, and further 5 g of the obtained flaky titanic acid (titania nanosheets) was added to this mixture. The materials were uniformly mixed to prepare the coating material composition. Note that the amount of the phosphoric acid group-containing resin blended was 5% by mass based on the total resin solid content of the lustrous coating material composition. In addition, the amount of the flaky titanic acid blended in the lustrous coating material composition was 10 parts by mass relative to 100 parts by mass of the solid content of the acrylic resin in the lustrous coating material composition. In Example 4, six coating films were prepared as multilayer coating films for evaluation tests.

Example 5

A lustrous coating material composition was prepared and further multilayer coating films were prepared in the same manner as in Example 1, except that 5% by mass of a phosphoric acid group-containing block copolymer alkylammonium salt (manufactured by BYK JAPAN KK under the trade name of DISPERBYK (registered trademark)-180) was used as the phosphoric acid group-containing resin. Note that the amount of the flaky titanic acid blended in the lustrous coating material composition was 10 parts by mass relative to 100 parts by mass of the solid content of the acrylic resin in the lustrous coating material composition. In Example 5, six coating films were prepared as multilayer coating films for evaluation tests.

Comparative Example 1

A coating material composition for comparison was prepared and further multilayer coating films for comparison were prepared in the same manner as in Example 1, except that no phosphoric acid group-containing resin was used. Note that the amount of the flaky titanic acid blended in the coating material composition for comparison was 10 parts by mass relative to 100 parts by mass of the solid content of the acrylic resin in the coating material composition for comparison. In Comparative Example 1, six coating films were prepared as multilayer coating films for comparison for evaluation tests.

Comparative Example 2

A coating material composition for comparison was prepared and further multilayer coating films for comparison were prepared in the same manner as in Example 1, except that 2.1 g of a urethane resin (manufactured by DIC Corporation under the trade name of HYDRAN WLS213) was used instead of the phosphoric acid group-containing resin, and that the amount of the urethane resin blended was 10% by mass based on the total resin solid content of the coating material composition. Note that the amount of the flaky titanic acid blended in the coating material composition for comparison was 10 parts by mass relative to 100 parts by mass of the solid content of the acrylic resin in the coating material composition for comparison. In Comparative Example 2, six coating films were prepared as multilayer coating films for comparison for evaluation tests.

Comparative Example 3

A coating material composition for comparison was prepared and further multilayer coating films for comparison were prepared in the same manner as in Example 1, except that tetrapropylammonium hydroxide (TPAH) was used instead of methylmorpholine and was mixed at a mole ratio ($H_{0.7}Ti_{1.825}O_4 \cdot H_2O$:TPAH) of 2:1 in producing the flaky titanic acid (titania nanosheets), and that 2.1 g of a urethane resin (manufactured by DIC Corporation under the trade name of HYDRAN WLS213) was used instead of the phosphoric acid group-containing resin, so that the amount of the urethane resin blended was 10% by mass based on the total resin solid content of the coating material composition. Note that the amount of the flaky titanic acid blended in the coating material composition for comparison was 10 parts by mass relative to 100 parts by mass of the solid content of the acrylic resin in the coating material composition for comparison. In Comparative Example 3, six coating films were prepared as multilayer coating films for comparison for evaluation tests.

Comparative Example 4

A coating material composition for comparison was prepared and further multilayer coating films for comparison were prepared in the same manner as in Example 1, except that tetrapropylammonium hydroxide (TPAH) was used instead of methylmorpholine and was mixed at a mole ratio ($H_{0.7}Ti_{1.825}O_4 \cdot H_2O$:TPAH) of 2:1 in producing the flaky titanic acid (titania nanosheets), that 50 g of an amino group-containing acrylic resin was used instead of the acrylic resin, and further that no phosphoric acid group-containing resin was used. Note that the amount of the flaky titanic acid blended in the coating material composition for comparison was 10 parts by mass relative to 100 parts by mass of the solid content of the acrylic resin in the coating material composition for comparison. In Comparative Example 4, six coating films were prepared as multilayer coating films for comparison for evaluation tests.

Note that the amino group-containing acrylic resin was prepared as follows. Specifically, first, 157.7 g of ethylene glycol monobutyl ether was placed in an acrylic resin reactor equipped with a stirrer, a thermometer, a reflux condenser, etc. Then, a solution containing 10.4 g of acrylic acid, 6.3 g of dimethylaminopropylacrylamide (DMAPAA), 3.99 g of 2,2'-azobis-2,4-dimethylvaleronitrile as an initiator, and 15 g of ethylene glycol monobutyl ether was added dropwise to the reactor. After completion of the dropwise addition, the mixture was stirred at 72° C. for 30 minutes, and then 1 g of a solution of 2,2'-azobis-2,4-dimethylvaleronitrile (1 wt %) in ethylene glycol monobutyl ether was added dropwise, followed by stirring at 72° C. for 2 hours and then by cooling. The obtained reaction liquid was diluted by adding water to a solid content (non-volatile component) concentration of 15% by mass, and further neutralized with 13 g of dimethylethanolamine (DMEA). Thus, a solution of the amino group-containing acrylic resin was prepared.

[Evaluation Tests]

The lustrous coating films obtained by using the lustrous coating material compositions obtained in Examples 1 to 5 and the coating films for comparison obtained by using the coating material compositions for comparison obtained in Comparative Examples 1 to 4 were evaluated in terms of design, adhesion (initial adhesion), and water-resistant adhesion (water resistance) by the following methods.

<Evaluation Test for Silky Texture (Design)>

The lightness (L* value) of the coating film obtained from each of the lustrous coating material compositions was measured by using a multi-angle spectrophotometer (manufactured by X-Rite, Incorporated. under the trade name of "Portable Multi-Angle Spectrophotometer MA68II") with an incident angle of 45 degrees (°) over acceptance angles of from 15 to 110 degrees (°), and the difference between the maximum value and the minimum value was evaluated as a flip-flop value (FF value). Note that a higher FF value indicates a better silky texture.

The obtained results are shown in the column "Design" in Table 1. Note that, in Table 1, "A" indicates an FF value of 40 or higher, "B" indicates an FF value of 30 or higher but lower than 40, and "C" indicates an FF value of lower than 30.

<Test for Adhesion (Initial Adhesion)>

The adhesion of each of the obtained lustrous coating films was evaluated by the cross-cut peeling test described in JIS D 0202-19889. Note that one hundred 2 mm×2 mm squares were formed in a cross-cut portion, and Cellotape (registered trademark) CT-24 (manufactured by Nichiban Co., Ltd., width: 24 mm) was used as the tape.

The obtained results are shown in the column "Adhesion (Initial Adhesion)" in Table 1. Note that, in Table 1, "A" indicates that the coating film was peeled in 0 squares out of the 100 squares (the coating film was not peeled at all), "B" indicates that the coating film was peeled in 1 to 10 squares out of the 100 squares, and "C" indicates that the coating film was peeled in 11 squares or more out of the 100 squares.

<Test for Water-Resistant Adhesion>

Distilled water or deionized water was placed in a constant-temperature water bath and kept at 40° C. Each test piece was kept in the water bath for 240 hours with a half or more of the test piece being immersed in the water. After that, the test piece was taken out of the water bath, and water droplets and stains were wiped off with a cloth or the like. Within 3 minutes, the test piece was examined in terms of wrinkles, cracks, swelling, peeling, decrease in luster, the presence of absence of uneven erosion, and the presence of absence of blisters at room temperature, and then evaluated by the same cross-cut peeling test as in the test for adhesion. The obtained results are shown in the column "Water-Resistant Adhesion" in Table 1. Note that, in Table 1, "A" indicates that the coating film was peeled in 0 squares out of 100 squares (the coating film was not peeled at all), "B" indicates that the coating film was peeled in 1 to 10 squares out of the 100 squares, and "C" indicates that the coating film was peeled in 11 squares or more out of the 100 squares.

TABLE 1

| | Phosphoric acid group-containing resin [% by mass] | Design | Adhesion Initial adhesion | Water-resistant adhesion |
|---|---|---|---|---|
| Example 1 | 5.0 | A | A | A |
| Example 2 | 10.0 | A | A | A and B |
| Example 3 | 15.0 | A | A | A and B |
| Example 4 | 5.0 | A | A | A |
| Example 5 | 5.0 | A | A | A and B |
| Comp. Ex. 1 | — | A | A | C |
| Comp. Ex. 2 | (Urethane resin) 10.0 | A | A | A, B, and C |

TABLE 1-continued

|  | Phosphoric acid group-containing resin [% by mass] | Design | Adhesion | |
|---|---|---|---|---|
|  |  |  | Initial adhesion | Water-resistant adhesion |
| Comp. Ex. 3 | (Urethane resin) 10.0 | A | A | C |
| Comp. Ex. 4 | — | A | A | C |

As is apparent from the results shown in Table 1, it was found that each of the lustrous coating films using the lustrous compositions of Examples 1 to 5 had a good silky texture with a high luster and was sufficiently excellent in not only initial adhesion but also water-resistant adhesion with the occurrence of peeling being sufficiently suppressed.

INDUSTRIAL APPLICABILITY

As described above, according to the present invention, it is possible to provide a lustrous coating material composition capable of forming a lustrous resin film which has a good silky texture with a high luster and which is sufficiently excellent in not only initial adhesion but also water-resistant adhesion with the occurrence of peeling being sufficiently suppressed, and a lustrous resin film and a multilayer coating film which are obtained by using the lustrous coating material composition and which have a good silky texture and has an excellent initial adhesion and an excellent water-resistant adhesion.

Accordingly, the lustrous coating material composition of the present invention can form a lustrous resin film and a multilayer coating film which have a deep, soft, and dense luster like silk and which are excellent in initial adhesion and water-resistant adhesion. Hence, the lustrous coating material composition of the present invention is extremely useful as a coating material for automobiles, a coating material for houses, and the like.

What is claimed is:

1. A lustrous coating material composition, comprising:
    a flaky titanic acid which is treated with methylmorpholine;
    a phosphoric acid group-containing resin; and
    an acrylic resin,
    wherein an amount of the phosphoric acid group-containing resin is 1 to 30% by mass based on a total resin solid content of the lustrous coating material composition, and
    an amount of the flaky titanic acid is 10 to 30 parts by mass relative to 100 parts by mass of the solid content of the acrylic resin.

2. A lustrous resin film, comprising:
    an acrylic resin;
    a flaky titanic acid dispersed in the acrylic resin, said flaky titanic acid being treated with methylmorpholine; and
    a phosphoric acid group-containing resin dispersed in the acrylic resin,
    wherein an amount of the phosphoric acid group-containing resin is 1 to 30% by mass based on a total resin solid content of the lustrous resin film, and
    an amount of the flaky titanic acid is 10 to 30 parts by mass relative to 100 parts by mass of the solid content of the acrylic resin.

3. A multilayer coating film to be coated on an article, said multilayer coating comprising:
    a base layer,
    and a clear layer, and
    the lustrous resin film according to claim 2, said lustrous resin film being provided between the base layer and the clear layer.

* * * * *